United States Patent [19]

Brinegar

[11] Patent Number: 4,463,053

[45] Date of Patent: Jul. 31, 1984

[54] DECORATIVE PANELS AND METHOD OF MAKING SAME

[76] Inventor: Bette L. Brinegar, P.O. Box 523, Bloomington, Ind. 47402

[21] Appl. No.: 483,540

[22] Filed: Apr. 11, 1983

[51] Int. Cl.³ .............................................. B44F 1/06
[52] U.S. Cl. .................................... 428/442; 156/71; 156/99; 428/38; 428/354
[58] Field of Search ................. 428/34, 38, 411, 430, 428/441, 442, 354, 520; 156/71, 99, 100

[56] References Cited

U.S. PATENT DOCUMENTS

| 21,896 | 10/1858 | Miles | 428/34 |
|---|---|---|---|
| 1,867,787 | 7/1932 | Watkins | 428/430 |
| 2,066,497 | 1/1937 | Watkins | 428/426 X |
| 2,783,176 | 2/1957 | Boicey | 428/422 X |
| 2,788,306 | 4/1957 | Cox et al. | 428/35 X |
| 2,884,126 | 4/1959 | Ulrich | 428/480 X |
| 2,959,507 | 11/1960 | Long | 428/142 |
| 3,460,303 | 8/1969 | Algrain et al. | 428/38 X |
| 3,697,312 | 10/1972 | Johnson et al. | 428/417 |
| 3,867,222 | 2/1975 | Plant et al. | 156/107 |
| 4,173,672 | 11/1979 | Mannheim | 428/203 |
| 4,217,378 | 8/1980 | Pizur, Sr. | 428/38 X |
| 4,293,603 | 10/1981 | Hayman-Chaffey et al. | 428/203 X |

Primary Examiner—Henry F. Epstein
Attorney, Agent, or Firm—Harvey B. Jacobson

[57] ABSTRACT

A decorative panel for use in buildings comprises a first layer of glass with its inner face painted over its entire area, a second layer of acrylic plastic with its inner face painted the same color as the first layer, and double-sided adhesive tape securing the inner faces of the respective layers together. The panel has a reflective opaque appearance and shatter-resistant properties making it suitable for diverse uses.

14 Claims, 3 Drawing Figures

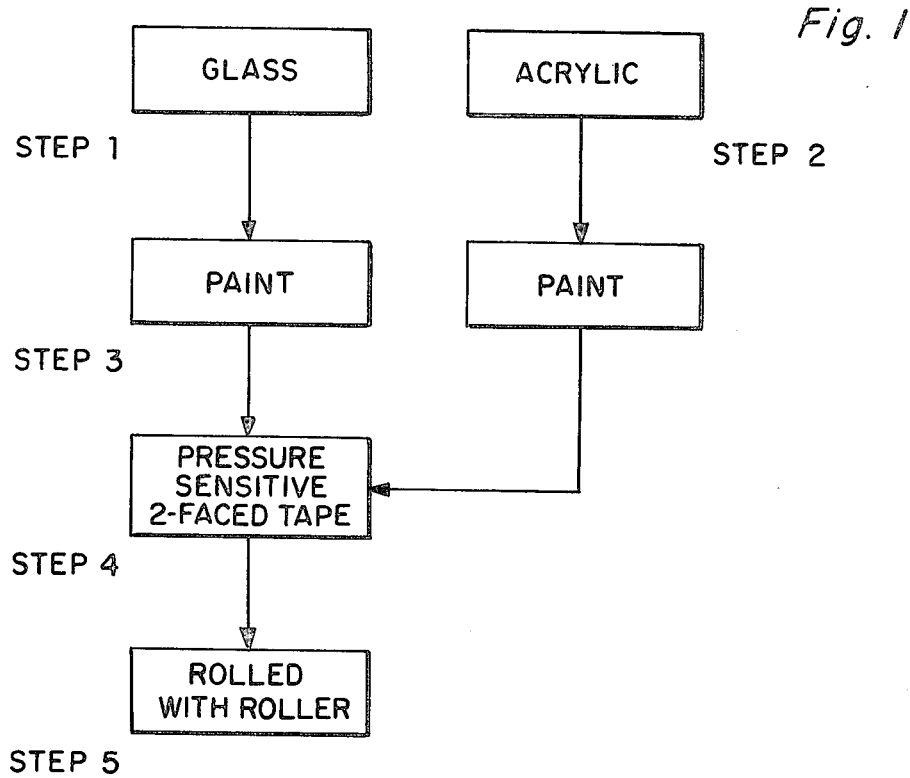
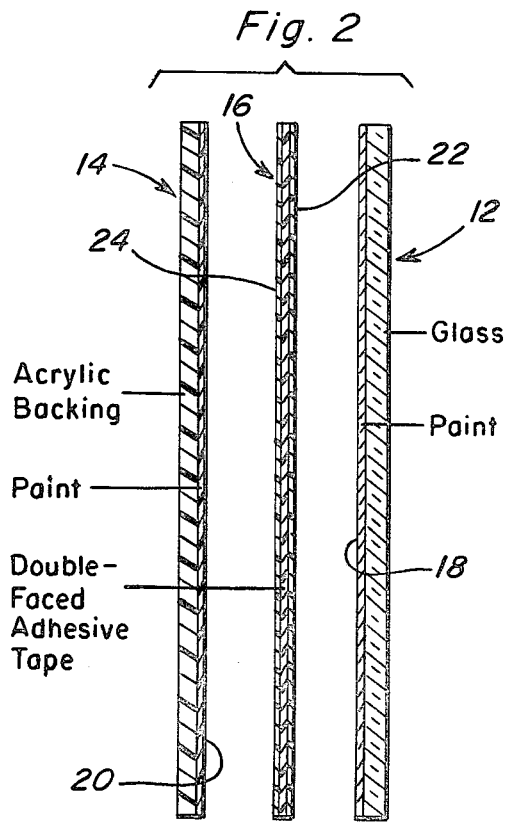
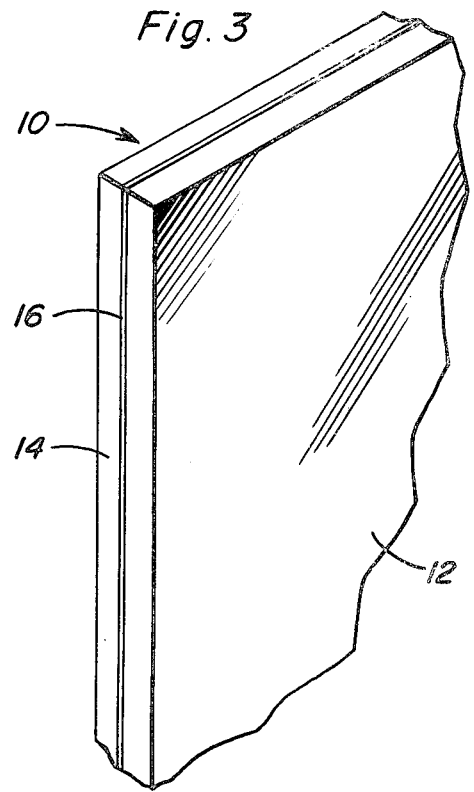

DECORATIVE PANELS AND METHOD OF MAKING SAME

BACKGROUND OF THE INVENTION

This invention relates to decorative panels for building decoration and like purposes, and to a method of making said panels.

One object of the invention is to provide a self-sustaining opaque reflective panel which may be used, for example, for wall or ceiling decoration when applied to an appropriate substrate, or which may be used without backing in a partition wall and the like.

Another object of the invention is to provide a simple and effective method for manufacturing decorative laminated panels for the uses noted above.

DESCRIPTION OF THE PRIOR ART

Applicant is aware of the following U.S. patents relating to laminated panels and the like:
U.S. Pat. No. 1,867,787, July 19, 1932
U.S. Pat. No. 2,066,497, Jan. 5, 1937
U.S. Pat. No. 3,867,222, Feb. 18, 1975
U.S. Pat. No. 4,173,672, Jan. 6, 1979

SUMMARY OF THE INVENTION

A decorative panel in accordance with the invention comprises a laminate of conforming first and second panel layers, the respective inner faces of which are adhesively secured together. The first panel layer may comprise a transparent material, conveniently glass, having its inner face painted any required color, and the second panel layer may have its inner face painted a like color. The second layer may conveniently comprise an acrylic plastic.

In order to adhere the respective inner faces of the panel layers together, the invention contemplates the use of a double-sided pressure-sensitive adhesive tape applied to the respective faces. The tape may extend over substantially the entire area of the panel and may comprise a polyester film with acrylic adhesive on both surfaces. This provides good adhesion to the painted panel faces and does not attack the glass, paint, or acrylic.

The invention provides a simple method of panel manufacture, involving only painting of the respective panel faces, application of the tape, (after removal of its release paper), and the application of pressure over the panel surface, for example, by roller. The invention allows for the production of a reflective colored panel with a shatter-resistant capability, which is well suited for diverse applications as previously outlined.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a block diagram illustrating a method of manufacturing a decorative panel in accordance with the invention.

FIG. 2 is an exploded view showing the separate layers of the decorative panel.

FIG. 3 is a perspective view on an enlarged scale of one corner of a completed panel.

DESCRIPTION OF THE PREFERRED EMBODIMENT

A self-sustaining decorative panel 10 in accordance with the invention (see FIG. 3) comprises a first panel layer 12 of a transparent material, preferably annealed glass, a second panel layer 14 conforming in shape to the first layer, and a double-sided pressure-sensitive adhesive tape 16 securing the inner faces of the respective layers together. The second panel layer 14 may also be of transparent material, such as an acrylic plastic, and the inner faces of the respective layers may both be painted the same color, whereby the finished panel has a reflective opaque appearance.

In manufacture, the inner faces of the respective panel layers are first painted their required color, as indicated at steps 1 and 2 in FIG. 1, the paint coatings being indicated at 18 and 20 in FIG. 2. Then, a sheet of double-sided adhesive tape 16, preferably conforming in area to the area of the panel layers has the release paper 22 on one adhesive surface removed, this surface being applied to the painted inner face of the panel layer 12 (step 3). Release paper 24 on the other surface of tape 16 is then stripped, and the painted inner face of panel layer 14 is applied to the exposed adhesive surface (step 4). Finally, the panel layers are pressed together, preferably by means of a roller, at a pressure of between about 15 and 40 pounds (step 5).

The adhesive tape which, to facilitate laying over the entire surface area of the panel layers, is preferably supplied in a width corresponding to that of the panel, may comprise a polyester film with acrylic adhesive on its surfaces. This type of adhesive is chosen because it has good adhesive properties with the painted panel surfaces, and does not attack glass paint or acrylic. The polyester film may have a thickness of 0.0005 inch and the total tape thickness may be about 0.0035 inch. The tensile strength of the tape may be about 12 lbs/ins. width and it may have an elongation of 100%.

The glass and acrylic panel layers may each vary in thickness, for example, from about ⅛ inch to about ½ inch, dependent on the use to which the panel is to be put. In a typical panel, for example, each layer may be about a ¼ inch thick. Acrylic is a preferred material for the second panel layer because of its strength/weight ratio, but other materials, such as glass, can also be used.

The coloring painted on the inner panel surfaces produces an opaque reflective panel well suited to the applications previously described. By painting both inner faces of the respective panel layers the same color throughout, uniformity of coloring is enhanced, reducing any pinhole effects or other blemishes which may occur with a single coating of paint. If any patterning is required, this may be effected by acid etching or engraving the respective panel layers.

It will be appreciated from the foregoing that the invention provides a form of decorative panel well adapted for use in buildings and the like, and which may be manufactured in a simple and economic manner.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In a decorative panel for use in buildings and the like, the panel having conforming first and second panel layers, and adhesive means securing the layers together to form a laminate, the improvement wherein said adhesive means comprises double-sided, pressure-sensitive adhesive tape with one surface adhered to an inner face of the first panel layer and the other surface adhered to an inner face of the second panel layer wherein the first panel layer is of transparent material and at least one of the panel layers has a painted inner face.

2. A panel as defined in claim 1 wherein the first panel layer is glass.

3. A panel as defined in claim 1 wherein the other panel layer has an inner face painted the same color as the inner face of the one panel layer.

4. A panel as defined in claim 3 wherein the first panel layer is glass and the second panel layer is an acrylic plastic.

5. A panel as defined in claim 1 wherein the first panel layer is glass with the inner face painted, and the second panel layer is an acrylic plastic with the inner face painted the same color as the inner face of the first panel layer.

6. A panel as defined in claim 5 wherein the adhesive tape is a polyester film with acrylic adhesive on each surface.

7. A panel as defined in claim 1 wherein the adhesive tape extends substantially over the entire surface area of the respective layers.

8. An opaque decorative panel for use in buildings and the like comprising a laminate of conforming first and second panel layers, and adhesive means comprising a double-sided pressure-sensitive adhesive tape securing the inner faces of the respective layers together, wherein first layer is glass, and the second layer is an acrylic plastic, at least one of the layers having its inner face painted.

9. A panel as defined in claim 8 wherein the respective inner faces of each layer are painted the same color over substantially their entire surface area.

10. A panel as defined in claim 8 wherein the adhesive means comprises a double-sided adhesive tape of polyester film and acrylic adhesive on its surfaces, the tape extending substantially over the entire area of the panel.

11. A method of manufacturing a laminated decorative panel having first and second panel layers at least one of which is of transparent material, the method comprising applying an adhesive surface of a double-sided pressure-sensitive adhesive tape to an inner face of the first panel layer, applying an inner face of the second panel layer to the other surface of the tape, and applying pressure against the layers to secure same together by means of the tape, the method including the step of painting the inner face of the first panel layer prior to applying the tape.

12. A method as claimed in claim 11 including the step of painting the inner face of the second panel layer prior to applying the same to the tape.

13. A method as claimed in claim 11 wherein the tape is applied to the inner face of the first panel layer over substantially its entire area.

14. A method as claimed in claim 11 wherein the pressure is applied by means of a roller.

* * * * *